United States Patent

[11] 3,628,345

[72] Inventor Alfred T. King
 614 York St., Lansdale, Pa. 19446
[21] Appl. No. 65,314
[22] Filed Aug. 19, 1970
[45] Patented Dec. 21, 1971
 Continuation-in-part of application Ser. No. 799,653, Feb. 17, 1969, now abandoned. This application Aug. 19, 1970, Ser. No. 65,314

[54] ICE-LIQUID SEPARATION COLUMN
 6 Claims, 7 Drawing Figs.
[52] U.S. Cl.......................................................... 62/123
[51] Int. Cl........................................................... B01d 9/04
[50] Field of Search............................................. 62/123, 124, 58

[56] References Cited
UNITED STATES PATENTS
3,251,193 5/1966 Wiegandt..................... 62/123 X Primary Examiner—William E. Wayner
Attorney—C. Hercus Just ABSTRACT: Mechanism for separating a concentrated solution of soluble solids from a solvent previously frozen into crystals thereof, providing means in which a column of the crystals is arranged into a loosely packed mass highly capable of rising by natural buoyancy in the solution in the column while holding smaller crystals in the rising mass and permitting the concentrated solution to drain from the upper portion of said rising column and thereby separate the same from said frozen crystals, applying a washing spray of the same solvent to the top of said rising column, and continuously removing the washed crystals from the top of said column of crystals to permit the column to continue to rise while draining concentrated solution therefrom.

PATENTED DEC 21 1971

INVENTOR
ALFRED T. KING

BY
ATTORNEY

INVENTOR
ALFRED T. KING

BY

ATTORNEY

ICE-LIQUID SEPARATION COLUMN

This application is a continuation-in-part of applicant's prior application, Ser. No. 799,653, filed Feb. 17, 1969 and abandoned upon the filing of the instant application.

CROSS-REFERENCE TO RELATED APPLICATION

The present invention is a unit which may be employed in the system comprising the subject matter of copending application, Ser. No. 799,714, filed Feb. 17, 1969.

BACKGROUND OF THE INVENTION

The separation of certain types of dissolved solutes in liquid solvents by subjecting the same to freezing so as to freeze the liquid solvent, where possible, to effect separation from the dissolved solute is a phenomenon which has been used in a number of different fields of activity, such as the separation of potable water from sea water. Another field is that of beverages, wherein solutions of coffee, tea, fruit juices and the like, have been subjected to freezing in order to concentrate the solute or beverage extract and thereby permit the same to be separated from as much of the liquid solvent as possible, which normally is water, following which the concentrated solute is dried so as to form a dry, powdered type of beverage extract which can be reconstituted merely by the addition of water, either hot or cold.

In regard to the so-called desalination of sea water, the normal desired product is the potable water, whereas the concentrated solute or extract normally is discarded, although it is conceivable that it could be dried to form certain types of unrefined salt complexes. However, the desired product under such circumstances is exactly opposite that which is normally desired in using the so-called freeze-type technique, referred to above, with respect to producing dried or powdered-type beverage concentrates or extracts. Thus, in said desalination of sea water, the manner and method of treating the removed concentrated salt extract is of little concern since it is the water which is separated from such concentrate that is the desired product.

In regard to using such freezing technique to produce a concentrated beverage extract, and particularly when producing coffee extract so as to provide a natural type of delicate aroma and flavor characteristic of fresh brewed coffee, it is highly important that certain precautions be exercised in the treatment of the concentrated solute comprising the beverage extract incident to freezing the water solvent and separating the same from the extract. One of the processes presently used to separate such concentrated beverage extract from the ice crystals comprising the frozen water solvent includes the use of special types of centrifuges.

During the operation of such centrifuges, it is found that the liquid concentrate is very extensively broken up, as well as being aerated. It also is caused to foam. The foam is difficult to control and the aeration resulting therefrom causes subsequent oxidation which results in a greatly degraded product due to poor flavor. Also, centrifuges of the type now used constitute a substantial capital investment and require the use of a motor of considerable power, as well as also requiring continual maintenance.

Typical examples of several types of desalination apparatus which have been devised heretofore are illustrated in U.S. Pat. No. 3,251,193, to Wiegandt, dated May 17, 1966, and U.S. Pat. No. 3,333,436, to Johnson et al., dated Aug. 1, 1967. Examples of previously developed devices for forming concentrated beverages and fruit juices are illustrated in U.S. Pat. No. Re 23,810 to Schmidt, dated Mar. 30, 1954, and U.S. Pat. No. 3,342,039, to Bridge et al., dated Sept. 19, 1967.

SUMMARY OF THE INVENTION

It is the particular object of this invention to provide a method and apparatus that can be employed in a freeze concentration process for removing water, as an example of a solvent, in the form of frozen ice crystals, from a water-bearing beverage substance such as coffee, tea, fruit juice, vegetable juice, milk, beer, wine, pharmaceuticals and other heat sensitive solutions or suspensions.

It is also an object of this invention to provide a means for separating frozen ice crystals from a solution or suspension which entrains the same and uniformly and gently washes the crystals to efficiently remove the desired concentrate therefrom, thereby producing a substantially complete separation of highly concentrated solution of the desired solute from the crystals of solvent, after which, if desired, the solute may be further concentrated and/or dried.

It is also an object of this invention to provide an apparatus for separating frozen ice crystals from a solution or suspension by means which cause no aerating of the solution or suspension.

It also is an object of this invention to provide a means for separating frozen ice crystals from a solution or suspension of beverage concentrate that will operate continuously and require very little or no attention.

It is also an object of this invention to provide a simple apparatus that consumes very little power, requires very little maintenance and will serve as a highly suitable substitute for the customary centrifuge in conventional freeze concentration processes for separating a concentrated solution of solute from frozen crystals of a solvent.

It is also an object of this invention to provide a means for protecting a solution from atmospheric air as frozen crystals are being separated from the solution.

It is also an object of this invention to provide means for enclosing the region in which a solution or suspension is separated from frozen crystals, whereby said region can be saturated with an inert gas to avoid contact of the solution or suspension with air and thereby reduce subsequent oxidation.

It is a further object of this invention to provide an apparatus and means whereby the buoyancy, or natural tendency of frozen ice crystals to float, is employed to cause the crystals to rise above the liquid level gently and without agitation and while the ice crystals are at least in moderately loose condition, whereby the crystals can be continuously washed efficiently and removed without disturbing the continuously rising column of frozen crystals.

It is still another object of this invention to provide apparatus and means to accept a continuous uniform flow of a solution of a beverage extract, such as coffee, for example, that has been at least partially frozen and contains ice crystals comprising frozen solvent, admit said mixture of extract and ice crystals to a vertical hollow cylinder or column of uniform interior diameter which is approximately twice the diameter of the inlet pipe that is connected to the lower end of the column and through which said mixture enters the column, whereby the column is large enough in diameter to reduce the velocity of the column of extract and ice crystals and permit it to rise gently in the hollow cylinder, while the crystals tend to loosen and separate from the compact nature in which they are delivered to the bottom of the cylinder. The upwardly moving mixture of concentrated beverage extract and ice crystals rises to a relatively high level where the extract drains by gravity away from the rising but undisturbed column of ice crystals, preferably through vertical slots provided in closely spaced manner in the circumference of the hollow cylinder. Said slots are high enough in the cylinder to provide clear space within the hollow cylinder for the ice crystals to collect therein and form a loosely packed column of the same, which floats by natural buoyancy within the fluid extract, due to there being sufficient body below the extract liquid level to provide the buoyancy necessary to cause the top of the ice crystal column to rise sufficiently above the liquid level that it is accessible to be gently sprayed uniformly with a controlled wash of the liquid solvent which drains into the liquid concentrate while the clear ice crystals at the top of the column continually are removed by a suitable scraper.

Figure 3:
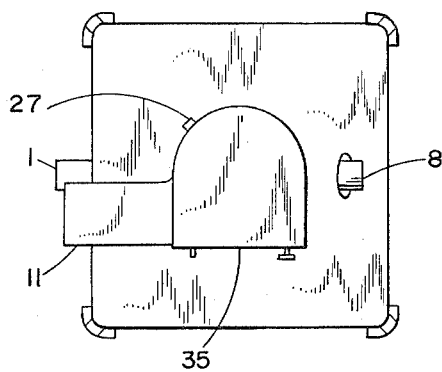
FIG. 3 is a plan view of the device shown in FIGS. 2 and 3.
Figure 4:
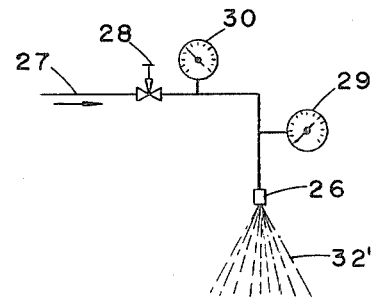
FIG. 4 is a diagrammatic view of exemplary water spray piping for the device.

Referring to the drawings, the infeed pipe 1 for the mixture of concentrated extract and ice crystals communicates with freezing apparatus of suitable type, such as that of the subject matter of Ser. No. 799,714. The crystals are, for example, from 0.004 to 0.010 inches in size. In processes of this type, these are regarded as relatively large. Elbow 2 and reducer 3 connect the infeed to vertical hollow column or cylinder 4, which is of uniform diameter and preferably about twice the diameter of pipe 1.

This arrangement permits the ice crystals to expand and separate or loosen up from the somewhat compact condition thereof in which they are discharged from pipe 1. Thus, the liquid concentrate separates from the crystals more readily and the buoyancy of the crystals in the liquid is enhanced. The mixture rises by such buoyancy in the cylinder until it reaches the discharge means at the top of the cylinder.

The discharge means comprises a closely spaced series of very narrow or fine vertical slots 5 which extend circumferentially around the upper portion of cylinder 4. The width of said slots is less than the diameter of the majority of the ice crystals in the mixture rising within the cylinder 4. While the mixture of liquid beverage concentrate and ice crystals of water solvent is so rising, the concentrate is completely enclosed from outside air and is not agitated to any appreciable extent, nor is it caused to froth or foam, thus minimizing oxidation of the concentrate. Hence, flavor and aroma characteristics are maintained at a very high level, which is far greater than in the product resulting from conventional centrifuging operations.

The height of the cylinder 4 is sufficient that very substantial buoyancy is afforded the ice crystals so as to cause the uppermost portion of the column thereof to rise above the level of the liquid concentrate in the column and thus enhance drainage of the concentrate therefrom to facilitate recovery of the concentrate by separation from such crystals. While such rising of the mixture is occurring, the upper level of the concentrate reaches the slots 5 and gently and gradually drains therefrom.

Desired gradual and gentle drainage of the liquid concentrate also is enhanced by the use of the vertical slots 5 as distinguished from a series of holes, for example, if used for discharge of the liquid.

When the crystals move upwardly along said slots, the edges of the slots actually act somewhat as guide tracks along which the crystals slide without agitation or impedance. If holes are used, there obviously is a tendency for individual crystals to become lodged therein and thus impede movement of the crystals, as well as prevent draining of liquid therethrough. There also is a tendency toward jostling and agitation by the crystals bumping past the holes. The benefit of the slots also is further increased by the fact that the slots extend to within about an inch of the top of the cylinder so that an appreciable extent of draining of liquid from the crystals occurs while the latter move upwardly for removal at the top of the cylinder, in drained condition.

Without limitation thereto and solely for purposes of illustration, it is submitted that a practical example of a device of the type herein described has been used successfully in which the cylinder 4 is approximately 4¼ inches in interior diameter and not less than about 2½ feet long from the lower end to the upper end, including the upper slotted portion. The diameter of inlet pipe 1 and elbow 2 is 2¼ inches, the radius of elbow 2 is approximately 3 inches, and the slots 5 are approximately 5½ inches long, which has been found to provide adequate drainage of the liquid concentrate in a nonagitated manner. All of the elements engaged by the liquid concentrated solute were made of 304 stainless steel.

Just below the lower extremity of the slots 5, a suitable catch pan 6 is fixed in liquidtight relation to the vertical cylinder, such as by welding. Pan 6 may be made of sheet metal, such as stainless steel and has a sloping bottom 7 to conduct the discharge of extract to and through discharge pipe 8 which is the outlet for the concentrated extract. Inlet pipe 1, elbow 2, reducer 3, vertical column 4, catch pan 6, sloping bottom 7, and outlet pipe 8 preferably are welded into one unitary structure which is free of leaks. This assembly is enclosed in a suitable thickness of thermal insulation within jacket 9 which extends from the underside of the catch pan 6 to near the inlet end, as illustrated.

A suitable frame having legs 36 supports the above-described assembly. A cover or jacket 37 also is provided to completely enclose the insulated pipe and support frame assembly, thereby protecting the concentrated extract from contamination and exposure to atmospheric air as it flows into catch pan 6 so as to further prevent oxidation of the concentrate and thus protect it. If desired, the space under cover 37 can be flooded or maintained in saturated condition with an inert gas, from a suitable source represented by pipe 38, to insure that the concentrated extract does not contact air to oxidize the same.

Figure 1:
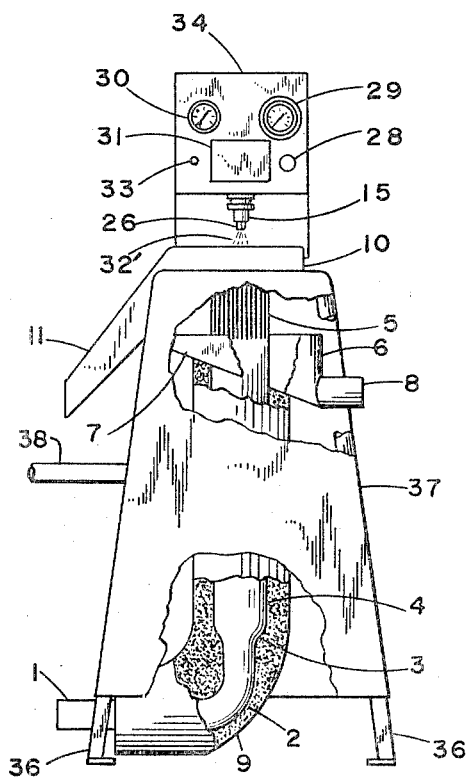
FIG. 1 is a front elevation of an exemplary device embodying the invention which has the cover partially broken away to reveal details therein.
Figure 2:
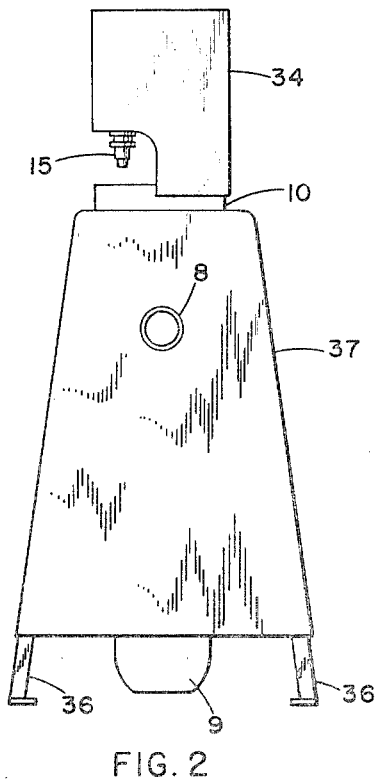
FIG. 2 is a right side elevation of the device shown in FIG. 1.
Figure 7:
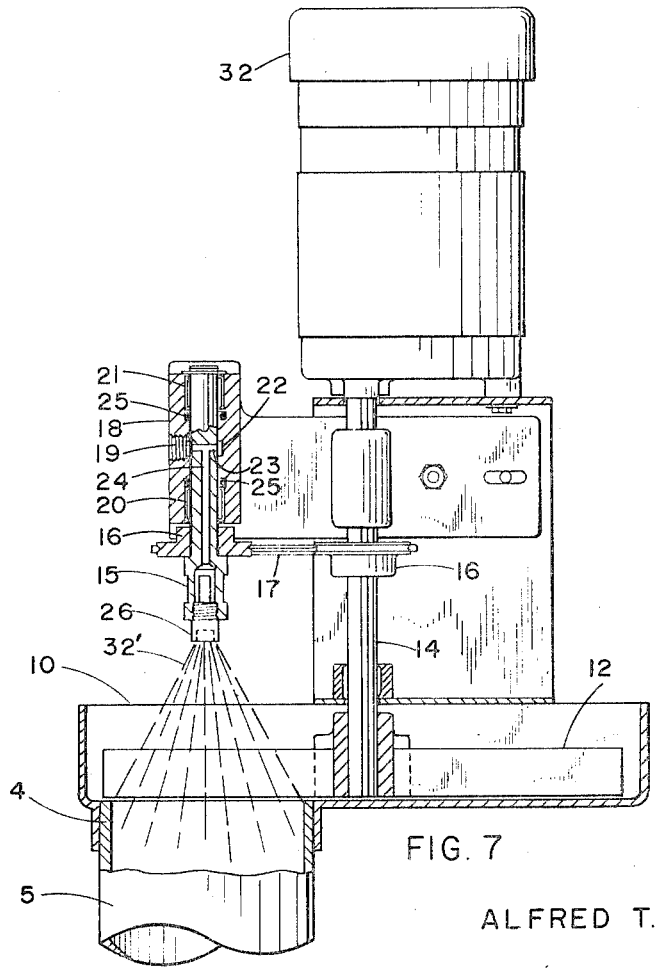
FIG. 7 is a still further enlarged vertical elevation of the device shown in FIGS. 5 and 6, parts thereof being in vertical section.

A circular receptacle or pan 10 having a tangential discharge chute 11 is fixed to the top of column 4 which passes through the bottom of pan 10 as clearly shown in FIG. 7. The bottom of circular pan 10 preferably is level with and is fixed to the top of vertical column 4 and the pan also has sides that enclose but are clear of the ends of the ice scraper 12. The ice scraper 12 is concentric with circular pan 10 and circular pan 10 and scraper 12 are both eccentric relative to the top of vertical pipe 4. As the ice scraper 12 rotates, each blade of the scraper will pass transversely across cylinder 4, as shown by arrow 13, and ice crystals will be scraped or shaved off of the top of the ice crystal column and fall into the tangential chute 11 which preferably extends downwardly, as shown in FIG. 1.

Figure 5:
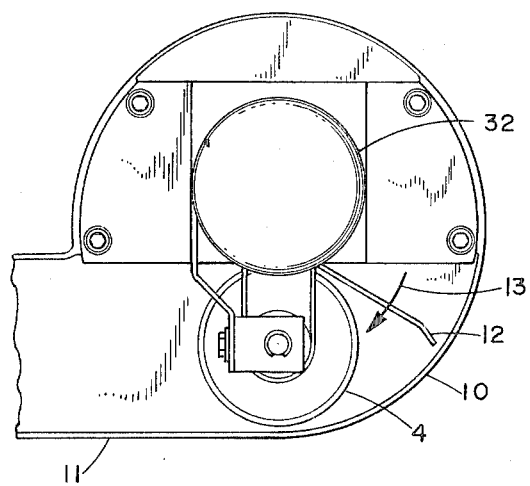
FIG. 5 is a fragmentary enlarged top plan view of the device shown in FIGS. 1-3 with the enclosing shell removed therefrom.
Figure 6:
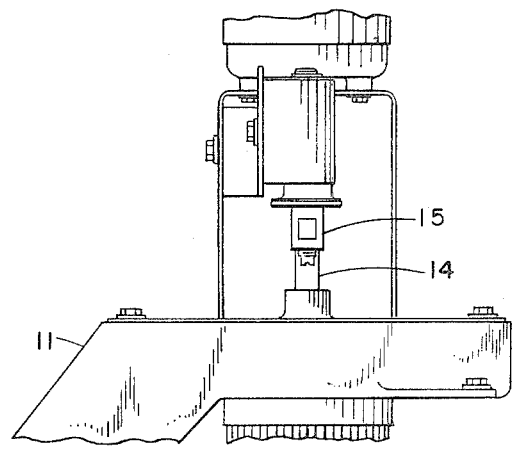
FIG. 6 is a fragmentary enlarged side elevation of part of the device shown in FIG. 5.

By such an arrangement, an actual transverse shearing of the column of ice crystals occurs and positive separation and discharge thereof into chute 11 is effected. As seen from FIG. 5, the blade 12 will not only shear the projected ice crystals from the column, but will also positively push them axially into the chute 11. Hence, this arrangement is much more effective than a scraper which, for example, rotates coaxially with cylinder 5, under which circumstances, the rotating blade primarily would merely rotate the column of ice crystals about the axis of cylinder 5.

The vertical drive shaft 14, on which ice scraper 12 is mounted, is directly connected to a motor and reducer unit 32 which turns ice scraper 12, by way of example and not limitation, approximately 30 revolutions per minute in the direction of arrow 13. Vertical shaft 15 is mounted in bearing block 18 so as to be parallel to drive shaft 14 and coaxial with vertical cylinder.[4] Vertical drive shaft 14 drives vertical shaft 15 by means of one or more small V-belt pulleys 16 and V-belts 17.

Vertical shaft 15 rotates in bearings 20 and 21 formed of self-lubricating material such as nylon synthetic resin and supported in block 18. A controlled water supply is connected to tapped hole 19 which communicates with annular manifold groove 22. Water is conducted from the annular groove 22, by radial hole 23 and vertical hole 24, to spray nozzle 26 which is carried by the lower end of shaft 15. O-rings 25 retain the water and prevent leakage as the vertical shaft 15 rotates.

The inlet pipe 27 is connected at its outer end to a suitable source of water supplied at uniform pressure and controlled uniform temperature. Needle valve 28 controls the flow of water to nozzle 26 and pressure gauge 29 indicates the pressure in pounds per square inch imposed upon nozzle 26. Temperature gauge 30 indicates the temperature of water being sprayed on the column of ice crystals.

Nozzle 26 may be adjusted to control the amount of water used and the character of the spray. For simplification, two nozzles were selected and a table was compiled giving the gallons per minute passed by either of the two nozzles at different pressures as indicated by pressure gauge 29. For convenience of the operator, a table 31 is shown in FIG. 1 as being permanently affixed conveniently to housing and sets forth the nozzle delivery rates from 0.05 to 0.21 gallons per minute at different pressures as shown on gauge 29.

Nozzle 26 emits a flat fan-shaped spray 32' no wider than the diameter of column 5, as shown in FIG. 7, and the rotation assures a uniform distribution of wash water constantly across the entire upper surface of the ice column as it rises. The spray pattern may be varied by vertically adjusting block 18. The rate of spray discharged from nozzle 26 is regulated relative to the rate of feed of the mixture of liquid concentrate and ice crystals to the bottom of cylinder 4 so as to provide a suitable amount of washing of the crystals without undue dilution of the concentrate.

The protective housing 34 which extends over the motor reducer 32 provides a convenient panel 35 upon which is mounted motor control switch 33, needle valve 28, pressure gauge 29, thermometer 30 and table 31.

In performing the process herein described, the mechanism is activated and after a relatively short run at a certain selected speed, the crystals discharged and the specific gravity of the liquid concentrate are inspected and determined. If found to be satisfactory, the operation is continued. If not satisfactory, various things may be and are adjusted, such as, for example, the freezing rate and degree of temperature produced by the freezing equipment, not shown, which produces the crystals fed to the inlet pipe 1, and the rate of feed of the mixture of crystals and liquid concentrate, until desired products are produced.

Reference is made hereinabove to the frozen crystals being of an exemplary size range between 0.004 and 0.010 inches in diameter. This range, under some circumstances, may be as large as 0.025 or even 0.030 inches in diameter. Crystals of these size ranges, especially in comparison with the sizes of the seed crystals from which they are formed, are considered to be relatively large crystals. Such crystals provide ready and effective separation of the frozen solvent, which they comprise, from the solute or concentrated extract during the rising of the column of crystals within column 4.

To further clarify the application of this invention, the following example is set forth:

EXAMPLE

A flow of coffee extract from a freeze concentration system is fed directly to inlet pipe 1 at a uniform rate. This coffee extract has been previously exposed to freezing conditions to develop crystals of pure ice intermixed with the liquid coffee extract. As the mixture flows into the enlarged vertical column 4, the velocity is markedly reduced. The mixture gradually rises toward the upper end of vertical column 4 and the liquid extract drains away from the crystals through slots 5, leaving the ice crystals in a relatively loosely packed floating mass which is constantly buoyed upwardly. The length of this column below the liquid level provides the buoyancy that causes the column to rise to the upper end of the vertical column 4, where it is sprayed with water 32' and scrapers 12 progressively remove the ice. The spray of water 32' washes the ice and flows down through it. Some of this water passes off with the ice as it is scraped off and the remainder flows down through the ice and mixes with the concentrated extract. A regulation of the amount of water sprayed controls the purity of the ice and the surplus that enters the concentrated extract.

Assuming that the above is a first stage of freeze concentration, the following would be a typical operation:

EXTRACT FEED 1201.11 pounds of liquid per hour at 1.098 specific gravity or 22.5 percent soluble solids
1201.11×0.225=270.24975 lb. per hour solids

CONCENTRATED EXTRACT 1.138 specific gravity or 31 percent soluble solids
270.25
0.31=871.77,419 lb. per hour concentrated liquid extract
1201.11 lb. per hour liquid feed at 22.5 percent solids
  871.77419 lb. per hour liquid concentrate at 30 percent solids
  329.33581 lb. per hour ice removed In the above operation, the water spray would be diluting the concentration of the extract. The water spray would be set to deliver approximately 0.12 gallon per minute or,
0.12×8.336×60=60 lb. of spray per hour One-half of this amount, 30 lb. per hour, or less would dilute the concentrate as follows:
871.77 lb. per hour
  30. lb. per hour
841.77 lb. per hour
270.25
841.77=0.321

Therefore, the spray has diluted the concentration from 32 percent to 31 percent.

The above conditions would be varied for different materials and to meet various requirements. A second stage of a recycling operation undertaken may be added to arrive at higher concentrations of the solute.

As referred to hereinabove, the nozzle 28 is shaped and designed to emit a flat fan-shaped spray 32'. Also the width of said spray and the height of the same above the column are so arranged that, as viewed in FIG. 7, the widest portion of the spray is no greater than the diameter of the cylinder 5 within which the column of a mixture of liquid concentrate and ice crystals is rising. Accordingly, there is maximum effective use of the spray water, due especially to the fact that the nozzle is constantly rotating at the exemplary speed referred to hereinabove, whereby the entire area of the upper end of the rising column of ice crystals is contacted by the spray water in a highly efficient manner which insures washing of the entire body of the upper portion of the rising column of crystals, with a minimum of excess dilution of the liquid concentrate. As a result, at the expense of a limited amount of dilution of the concentrate, separation of substantially the entire amount of liquid concentrate from the ice crystals is assured and thus, no appreciable amount of the concentrate is lost when the ice crystals are separated from the upper end of the column for discharge to chute 11.

Also, due to the fact that the washing spray is introduced at the very top of the column of rising ice crystals from which nearly all of the concentrate has naturally drained by gravity or washed therefrom and has been discharged through the slots 5 at the upper end of cylinder 4, the possibility of introducing ambient air into the liquid concentrate by the spray water is negligible, thereby further minimizing the possibility of oxidizing the liquid concentrate which would impair the flavor and aroma thereof.

From the foregoing, it will be seen that the apparatus comprising the subject matter of the present invention is relatively simple and sturdy, requires minimum servicing and attention, and is highly efficient to separate substantially all liquid concentrate of a beverage extract from the frozen solvent which is in the form of ice crystals which are continuously removed from the upper end of the column of rising mixture. The rising column of ice crystals also is effectively washed to insure maximum recovery of the liquid concentrate without wasting the same in the discharged ice crystals.

The handling and treatment of the liquid concentrate during the entire procedure also is such as to provide gradual and gentle movement thereof while out of contact with the ambient atmosphere and without agitating or causing frothing of the liquid concentrate in any way, whereby the quality of flavor and aroma of the liquid concentrate is maintained at a very high level and closely approaches that of freshly brewed beverage, especially when the liquid concentrate being recovered comprises brewed coffee or tea.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. Apparatus operable to separate a liquid beverage concentrate solute from a mixture with frozen crystals of solvent, said apparatus comprising in combination, a vertical cylinder of substantially uniform diameter having a solution inlet conduit of smaller diameter communicating with the lower end thereof to permit loosening of the crystals in said rising column thereof and said cylinder also being free of obstructions therein, thermal insulation surrounding said inlet and cylinder, discharge means for the liquid concentrate solute directly in the walls of the cylinder adjacent the upper end thereof comprising parallel narrow vertical slots of a width adequate to pass substantially only concentrated liquid solute and prevent the passage of frozen crystals of the size entrained in said concentrated liquid solute, a pan surrounding and fixed to said cylinder immediately below the lower ends of said discharge slots and shaped to receive concentrated liquid solute discharged by gravity thereto from said slots and having discharge means to conduct said solute from said pan, said cylinder being sufficiently lone to support a column of frozen crystals by natural buoyancy within and by the concentrated liquid solute within said cylinder and adapted to float the upper end of said column of crystals to a level projecting above the upper end of said cylinder to permit substantially complete draining of the solute therefrom by gravity, and crystal removal means mounted for movement transversely to the axis of said cylinder adjacent the upper end thereof and operable to shearingly separate from said rising column of crystals the uppermost portion thereof which projects above the upper end of said cylinder to thereby remove the same from said apparatus and concentrated liquid solute.

2. The apparatus according to claim 1 in which said crystal removing means comprises a blade rotatable about an axis parallel to said cylinder and adjacent one side thereof to effect movement of said blade in an arc transversely across the top of said cylinder in a manner to shave from the column of crystals therein the uppermost portion thereof projecting above the upper end of said cylinder.

3. The apparatus according to claim 2 further including a panlike receptacle surrounding the upper end of said cylinder and connected thereto, said pan having a rim within which said blade operates and a tangential discharge chute which slopes downwardly and is operable to receive crystals shaved from the column thereof by said blade.

4. The apparatus according to claim 1 further including a liquid spray nozzle dependingly supported vertically above the upper end of said column of ice crystals and operable to spray a pattern of liquid washing solvent no wider than the upper end of said cylinder directly upon the rising column of crystals and thereby wash the same relatively free from adhering concentrated solute.

5. The apparatus according to claim 4 in which said nozzle is shaped to discharge a relatively flat fan-shaped jet of washing liquid of which the widest dimension is no greater than the diameter of said cylinder and said nozzle being supported for rotation about the vertical axis of said cylinder, and means to rotate said nozzle at a relatively slow speed.

6. The apparatus according to claim 4 in which said nozzle is shaped to discharge a diverging spray spreading downward and outward from said nozzle, and said apparatus further including means to adjust said nozzle vertically toward and from the top of said column of ice crystals to vary the width of said spray at its engagement with said top of said column of ice crystals.

* * * * *